(12) United States Patent
Watanabe et al.

(10) Patent No.: US 6,301,060 B1
(45) Date of Patent: *Oct. 9, 2001

(54) LENS BARREL

(75) Inventors: Takashi Watanabe, Fuchu; Masanori Ishikawa, Tokyo; Tatsuya Sato, Yokohama; Mitsuru Shinohara, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/496,490

(22) Filed: Feb. 2, 2000

(30) Foreign Application Priority Data

Feb. 18, 1999 (JP) ................................................. 11-030318

(51) Int. Cl.⁷ ..................................................... G02B 15/14
(52) U.S. Cl. ........................................... 359/694; 359/703
(58) Field of Search .................................... 359/694, 701, 359/703, 704, 821, 823, 826, 830

(56) References Cited

U.S. PATENT DOCUMENTS 6,024,457 * 2/2000 Kawai et al. ........................ 359/611

* cited by examiner

*Primary Examiner*—Georgia Epps
*Assistant Examiner*—Saeed Seyrafi
(74) *Attorney, Agent, or Firm*—Robin, Blecker & Dale (57) ABSTRACT

A lens barrel includes fixed tubes each arranged to hold an optical unit having an optical axis, a rotating tube arranged to rotate around the optical axis with respect to the fixed tubes, wherein the rotating tube is provided, at front and rear portions thereof as viewed along the optical axis, respectively with end surfaces of ring shape having a center thereof on the optical axis, and each of the fixed tubes is provided with an end surface opposite to the associated end surface of the rotating tube, and sheet members of ring shape having a center thereof on the optical axis, each of the sheet members being disposed on a space formed by each end surface of the rotating tube and the associated end surface of the fixed tubes, so that the torque of a rotating operation on the rotating tube is lessened and, yet, the lens barrel excels in dust-proof and drip-proof.

15 Claims, 5 Drawing Sheets

LENS BARREL

BACKGROUND OF THE INVENTION

1. Field of the Invention

The present invention relates to a lens barrel adapted for an optical apparatus such as a camera or the like, and more particularly to the dust-proof and drip-proof structural arrangement of a lens barrel or the like.

2. Description of Related Art

The rotating parts, such as rotary operation parts, of lens barrels are often arranged to be in a dust-proof and drip-proof structure. Generally, the dust-proof and drip-proof structure is arranged to prevent intrusion of water, dust, etc., by inserting a rubber O-ring in between a body member and a rotating member of the lens barrel.

However, such a dust-proof and drip-proof structural arrangement generates a large frictional force between the O-ring and the rotating member. The large frictional force necessitate exertion of a large force in operating the rotating member. The conventional arrangement thus has often made the rotating member difficult to operate, or has prevented effective utilization of space due to limitation imposed on the diameter of the O-ring.

BRIEF SUMMARY OF THE INVENTION

It is an object of the invention to provide a lens barrel which is arranged to adequately maintain a good water-proof effect and yet to excel in operability.

To attain the above object, in accordance with an aspect of the invention, there is provided a lens barrel which comprises fixed tubes each arranged to hold an optical unit having an optical axis, a rotating tube arranged to rotate around the optical axis with respect to the fixed tubes, wherein the rotating tube is provided, at front and rear portions thereof as viewed along the optical axis, respectively with end surfaces of ring shape having a center thereof on the optical axis, and each of the fixed tubes is provided with an end surface opposite to the associated end surface of the rotating tube, and sheet members of ring shape having a center thereof on the optical axis, each of the sheet members being disposed on a space formed by each end surface of the rotating tube and the associated end surface of the fixed tubes.

Further, in the lens barrel, a wave washer of ring shape having a center thereof on the optical axis, and having convex portions and concave portions as viewed along the optical axis, is disposed in the space.

Further, the rotating tube is a manual operation ring arranged to be manually rotated to move another optical unit along the optical axis.

Further, each of the fixed tubes has a sliding surface arranged to restrict movement of the rotating tube along the optical axis and to allow the rotating tube to rotate thereon, and a water-repellant agent is applied to the sliding surface.

Further, the sheet members are made of plastic material.

Further, the sheet members are made of vinyl chloride material.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
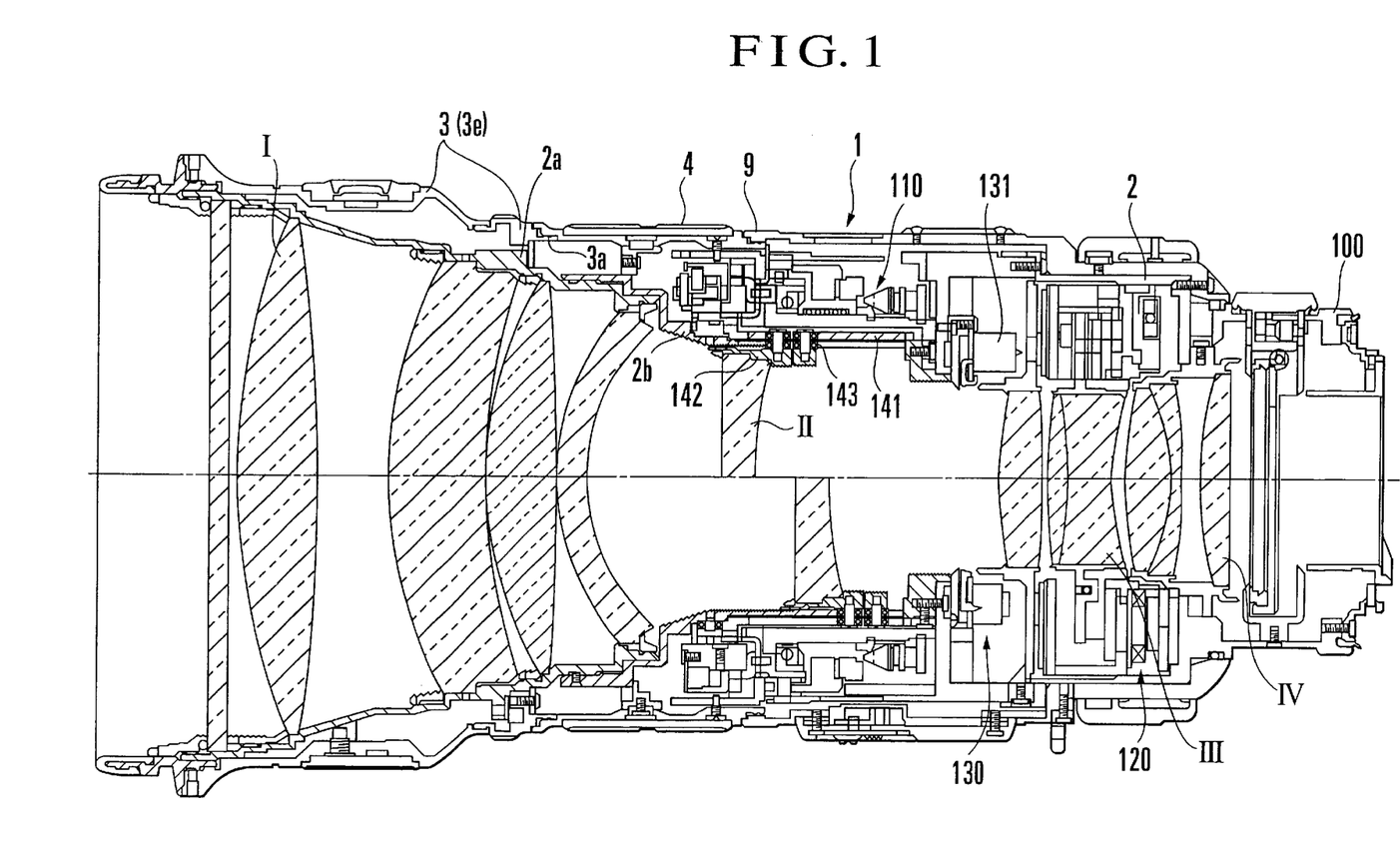
FIG. 1 is a sectional view showing a lens barrel according to a first embodiment of the invention.
Figure 2:
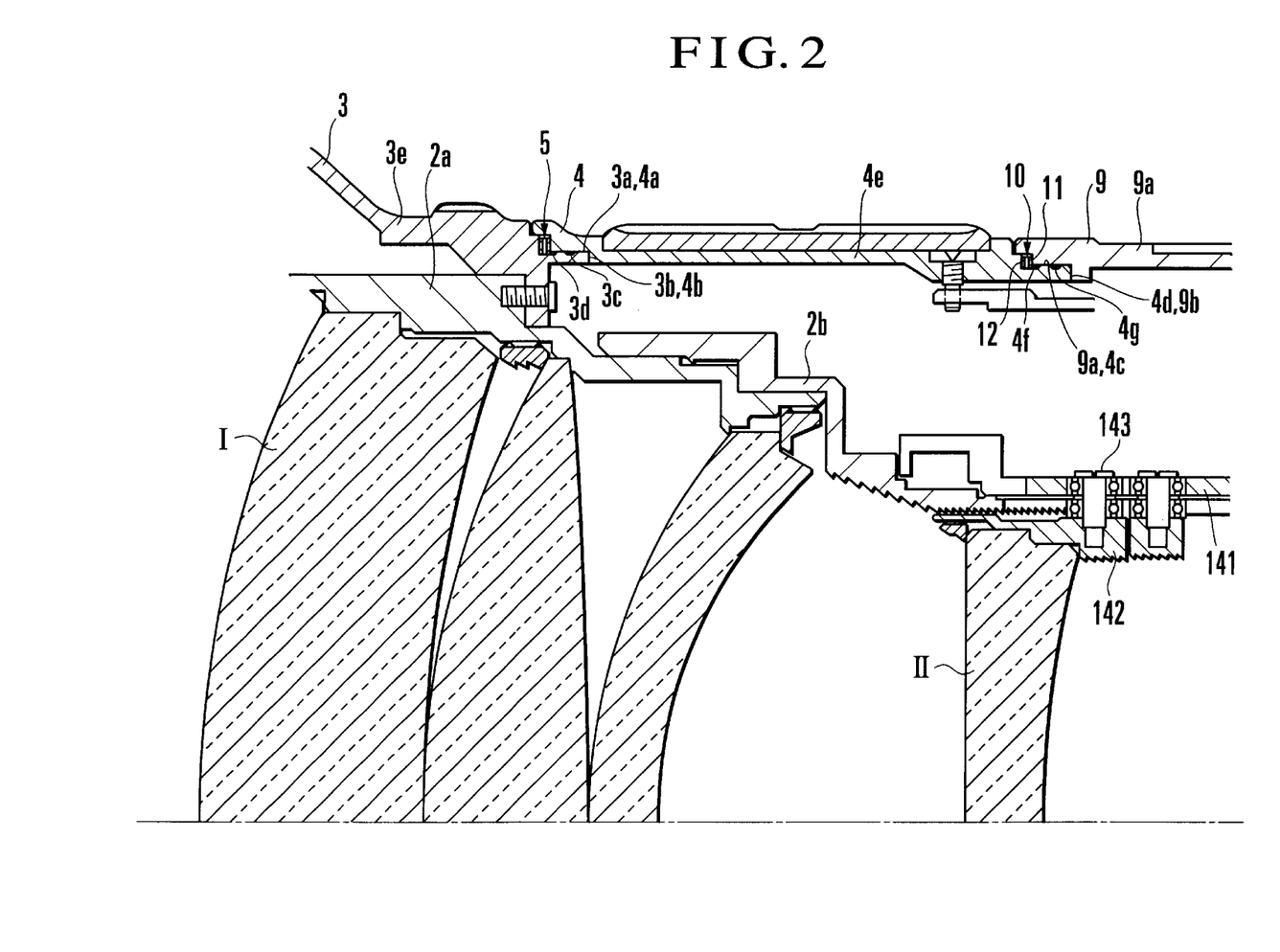
FIG. 2 is a sectional view showing essential parts of the lens barrel shown in FIG. 1.
Figure 3:
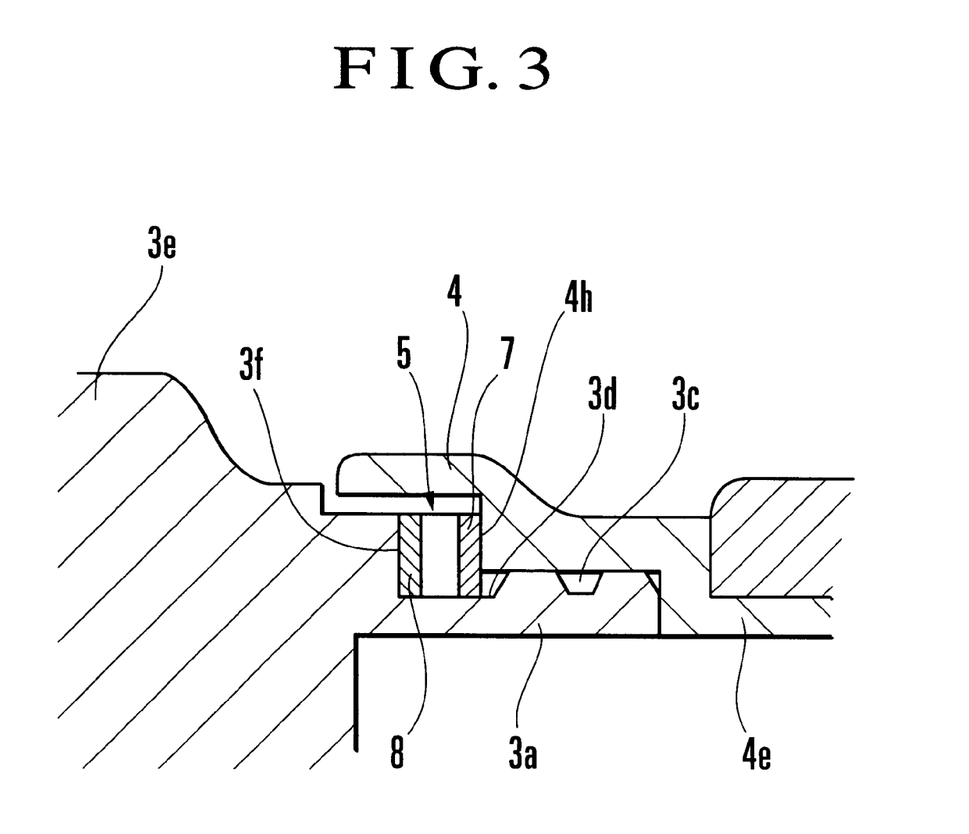
FIG. 3 is an enlarged view showing in part the essential parts of the lens barrel shown in FIG. 2.

FIGS. 1, 2 and 3 show a lens barrel according to a first embodiment of the invention. The lens barrel is either arranged to be mounted on an optical apparatus such as a camera or the like, or is arranged integrally with the optical apparatus.

Referring to FIG. 1, the lens barrel 1 is a photo-taking optical system having, in order from an object side, a fixed first lens group I, a second lens group II, a third lens group III and a fourth lens group IV. A mount part 100 is provided in a rear portion of the lens barrel 1 for coupling with the optical apparatus (camera). The mount part 100 is provided with contacts for communication with the optical apparatus (camera).

A circuit board (not shown) is arranged inside of the lens barrel 1 to form a circuit for the communication with the optical apparatus. The circuit is arranged to process signals received from the optical apparatus and to drive and control actuators 110 and 131.

The second lens group II is a focusing lens group, which is arranged to be driven by the actuator 110 in accordance with a signal coming from the optical apparatus to move along an optical axis.

The third lens group III is an image stabilizing lens. Two angular velocity sensors (not shown) are arranged within the lens barrel 1 to detect vibrations taking place in directions which are perpendicular to each other. Signals from these sensors are processed by the circuit. Two actuators 120 (one of them being not shown) which are arranged near to the third lens group III in a state of orthogonally intersecting each other are driven according to the amounts and directions of the vibrations. Then, the third lens group III is driven by the actuators 120 in the directions perpendicular to the optical axis in such a way as to prevent image shakes from being caused by vibrations of a hand or hands holding the optical apparatus.

A diaphragm unit 130 is disposed between the second lens group II and the third lens group III to adjust the quantity of light. To adjust the quantity of light, a signal from the optical apparatus is processed by the circuit and the actuator 131 is driven according to the processed signal to operate the diaphragm unit 130.

A front fixed tube 2a has fitting engagement parts arranged to engage the first lens group I and screw parts arranged to have a retaining ring screwed thereon to secure the first lens group I to the fitting engagement parts. These parts are arranged in a plurality of portions. The front fixed tube 2a is secured to a rear fixed tube 2b with screws.

A cam tube 141 and a moving tube 142 fittingly engage the inner and outer sides of the rear fixed tube 2b. The cam tube 141 is provided with a plurality of cam grooves for causing the moving tube 142 to move along the optical axis. The moving tube 142 is provided with cam followers 143 which are fitted in the cam grooves of the cam tube 141.

The second lens group II fittingly engages the moving tube 142 and is secured to the moving tube 142 with a retaining ring. The moving tube 142 is arranged to move along the optical axis for adjusting focus when the cam tube 141 is caused to rotate either by the actuator 110 or by a driving force of a manual operation ring 4. The actuator 110 is a known motor called as the vibration wave motor. Since the actuator and the lens driving mechanism are well known, the details of them are omitted from description.

A front exterior ring 3 is secured to the outside of the front fixed tube 2a with screws. The front exterior ring 3 is provided with a fitting engagement part 3a which is formed in a cylindrical shape to extend rearward in the optical axis direction from the body part 3e of the front exterior ring 3 and loosely engages an inner fitting engagement part 4a of the manual operation ring 4 with some clearance left between them. As shown in FIG. 2, the rear end surface 3b of the fitting engagement part 3a abuts on the front end surface 4b of the manual operation ring 4 to restrict the forward movement of the manual operation ring 4 in the optical axis direction.

A rear exterior ring 9 is disposed on the rear side of the manual operation ring 4. The rear exterior ring 9 is secured to a fixed tube 2 in such a way as to have the manual operation ring 4 sandwiched between the front exterior ring 3 and the rear exterior ring 9.

The manual operation ring 4 is provided with a fitting engagement part 4c which is formed in a cylindrical shape to extend rearward in the optical axis direction from the body part 4e of the manual operation ring 4 and loosely engages an inner fitting engagement part 9a of the rear exterior ring 9 with some clearance left between them. The rear end surface 4d of the fitting engagement part 4c abuts on the front end surface 9b of the rear exterior ring 9. The rear end surface 4d is thus arranged to restrict the rearward movement of the manual operation ring 4 in the optical axis direction. With the rearward movement of the manual operation ring 4 in the optical axis direction thus restricted in addition to the restriction of forward movement thereof in the optical axis direction mentioned above, the manual operation ring 4 can be rotatively operated at a set position in the optical axis direction.

A water-repellent agent, such as grease or silicone oil, is applied to the fitting engagement parts 3a, 4a, 4c and 9a. The use of the water-repellent agent not only prevents intrusion of water but also effectively smoothes the rotation of the manual operation ring 4. Further, oil grooves 3c and 4g are formed in the outer circumferential surfaces of the fitting engagement parts 3a and 4c.

In the case of the first embodiment, with the lens barrel arranged in the manner as described above, a circumferential groove 3d is formed at a portion between the body part 3e and the fitting engagement part 3a of the front exterior ring 3, as shown in detail in FIG. 3. A washer (a sheet-like ring member) 7 and a wave washer (a pressing ring member) 8 are fitted into a void space part 5 which is formed jointly by the circumferential groove 3d and a rear end surface 3f in the optical axis direction of the body part 3e of the front exterior ring 3 and a front end surface 4h in the optical axis direction of the manual operation ring 4 which are opposed to each other.

The inner circumferential edge of the washer 7 fittingly engages the bottom part of the circumferential groove 3d. The rear surface of the washer 7 abuts on the front end surface 4h in the optical axis direction of the manual operation ring 4.

The wave washer 8 is formed in a waved shape having a plurality of crests. Before the wave washer 8 is fitted into the void space part 5, the height of the wave part of the wave washer 8 is a little larger than the size of the space part 5 in the optical axis direction. Therefore, when the manual operation ring 4 is mounted with the washer 7 and the wave washer 8 inserted into the space part 5, the washer 7 is pushed against the front end surface 4h in the optical axis direction of the manual operation ring 4 by the force of resilience generated by the elastic deformation of the crest part of the wave washer 8.

A circumferential groove 4f is formed also in a part of the manual operation ring 4 between the body part 4e and the fitting engagement part 4c of the manual operation ring 4 (see FIG. 2). A void space part 10 is formed by the circumferential groove 4f and a rear end surface in the optical axis direction of the body part 4e of the manual operation ring 4 and a front end surface in the optical axis direction of the rear exterior ring 9 which are opposed to each other. A washer (a sheet-like ring member) 11 and a wave washer (a pressing ring member) 12 are fitted into the void space part 10.

The inner circumferential edge of the washer 11 fittingly engages the bottom part of the circumferential groove 4f. The rear surface of the washer 11 abuts on the front end surface in the optical axis direction of the rear exterior ring 9.

The wave washer 12 is formed in a waved shape having a plurality of crests. Before the wave washer 12 is fitted into the void space part 10, the height of the wave part of the wave washer 12 is a little larger than the size of the space part 10 in the optical axis direction. When the manual operation ring 4 is mounted with the washer 11 and the wave washer 12 inserted into the space part 10, therefore, the washer 11 is pushed against the front end surface of the rear exterior ring 9 by the force of resilience generated by the elastic deformation of the crest part of the wave washer 12.

The washers 7, 8, 11 and 12 are made of plastic sheet material or vinyl chloride sheet material. The resilient forces generated with the waved shapes of the washers 8 and 12 pushed are weak forces and are nothing more than a force just strong enough for pushing the washers 7 and 11 respectively against the manual operation ring 4 and the rear exterior ring 9.

Each of the washers 7, 8, 11 and 12 is formed in a ring-like shape without any notched or cut part.

With the lens barrel arranged as described above, the washers 7 and 11 and the water-repellent agent effectively prevent water and dust from intruding from outside into the inside of the lens barrel through clearances between the fitting engagement parts 3a, 4a, 4c and 9a of the manual operation ring 4 and the exterior rings 3 and 9. Besides, since the washers 7 and 11 are made of plastic sheet, vinyl chloride sheet or the like, the use of them makes the manual operation ring 4 more smoothly movable, requiring a less amount of operation force than the use of rubber O-rings having large friction.

Further, although the water-repellent agent is applied to the fitting engagement parts 3a, 4a, 4c and 9a, the water-repellent agent is effectively prevented from leaking to the outside by the washers 7 and 11.

Figure 4:
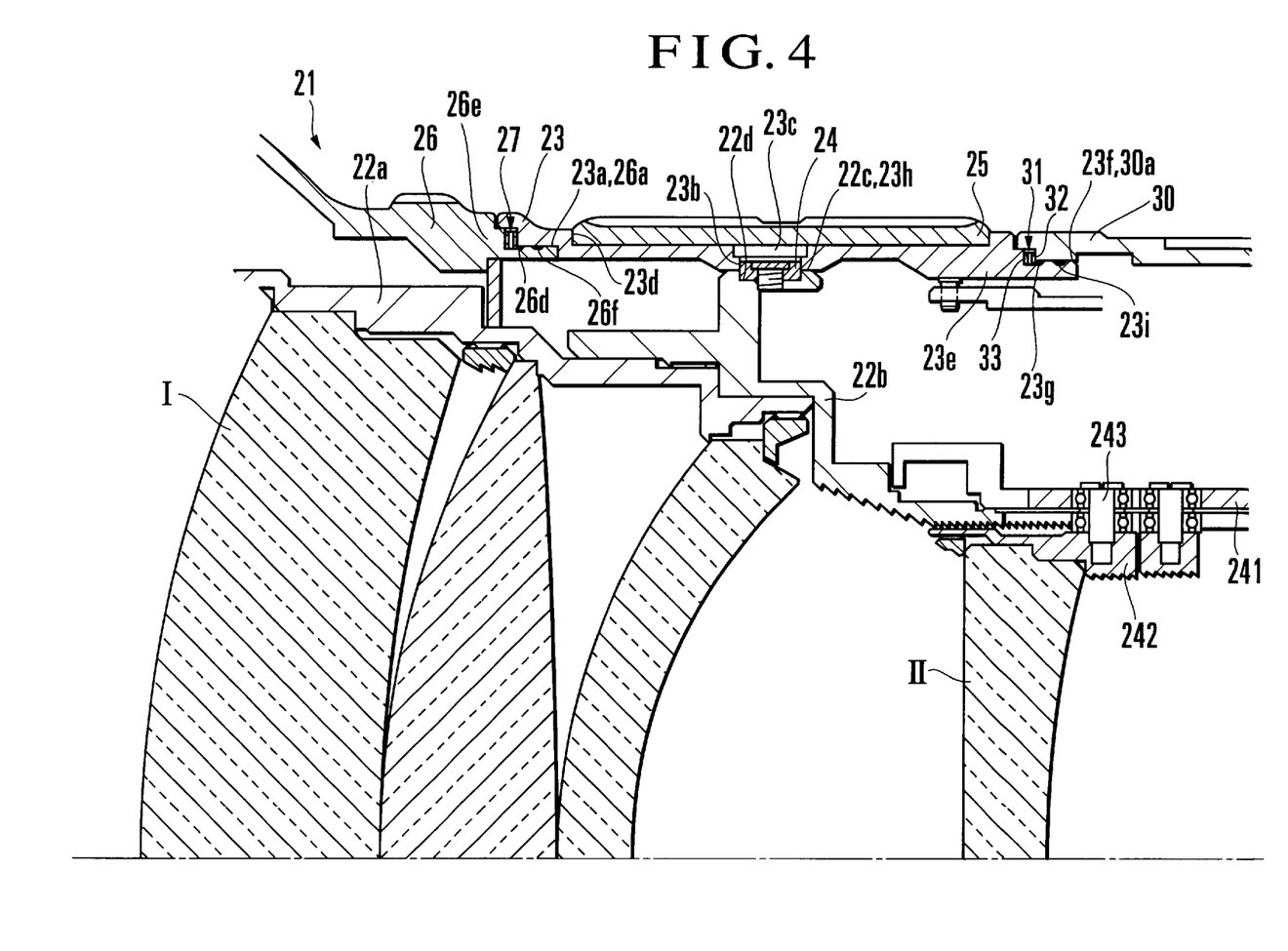
FIG. 4 is a sectional view showing essential parts of a lens barrel according to a second embodiment of the invention.
Figure 5:
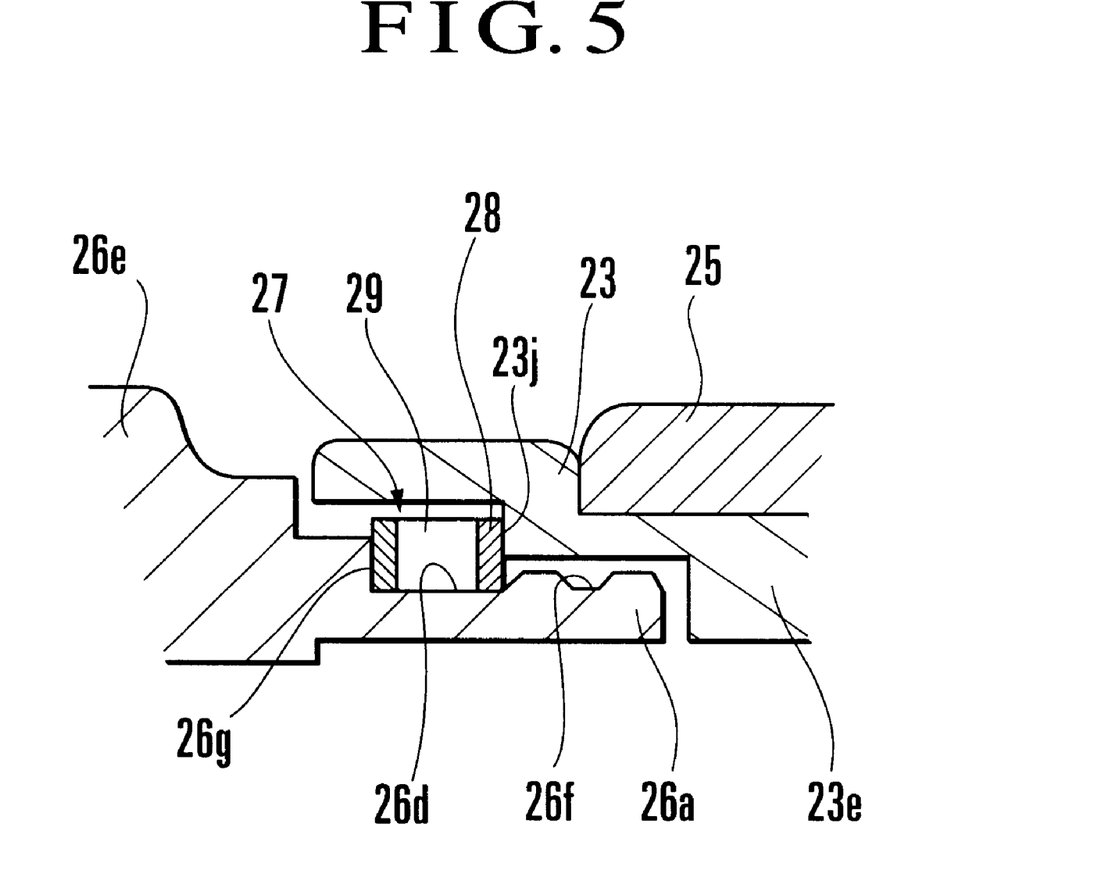
FIG. 5 is an enlarged view showing in part the essential parts of the lens barrel shown in FIG. 4.

FIGS. 4 and 5 show a lens barrel 21 according to a second embodiment of the invention. The basic structural arrangement of the lens barrel 21 is similar to that of the lens barrel 1 described in the first embodiment.

In the second embodiment, a front fixed tube 22a has fitting engagement parts arranged to engage a first lens group I and screw parts arranged to have a retaining ring screwed thereon to secure the first lens group I to the fitting engagement parts. These parts are arranged in a plurality of parts. The front fixed tube 22a is secured to a rear fixed tube 22b with screws.

A cam tube 241 and a moving tube 242 fittingly engage the inner and outer sides of the rear fixed tube 22b. The cam tube 241 is provided with a plurality of cam grooves for causing the moving tube 242 to move along the optical axis of the lens barrel. The moving tube 242 is provided with cam followers 243 which are fitted into the cam grooves of the cam tube 241.

A second lens group II fittingly engages the moving tube 242 and is secured to the moving tube 242 with a retaining ring. The moving tube 242 is arranged, in the same manner as in the first embodiment, to move along the optical axis for adjusting focus when the cam tube 241 is caused to rotate either by an actuator or by a driving force of a manual operation ring 23.

A front exterior ring 26 is secured to the outside of the front fixed tube 22a. The front exterior ring 26 is provided with a fitting engagement part 26a which is formed in a cylindrical shape to extend rearward in the optical axis direction from the body part 26e of the front exterior ring 26 and loosely engages an inner fitting engagement part 23a of the manual operation ring 23 with some clearance left between them.

A rear exterior ring 30 is disposed on the rear side of the manual operation ring 23, and is secured to a fixed tube (not shown) in such a way as to have the manual operation ring 23 sandwiched between the front exterior ring 26 and the rear exterior ring 30.

The manual operation ring 23 is provided with a fitting engagement part 23f which is formed in a cylindrical shape to extend rearward in the optical axis direction from the body part 23e of the manual operation ring 23 and loosely engages an inner fitting engagement part 30a of the rear exterior ring 30 with some clearance left between them.

A water-repellent agent, such as grease or silicone oil, is applied to the fitting engagement parts 23a, 26a, 23f and 30a. The use of the water-repellent agent not only prevents intrusion of water but also effectively smoothes the rotation of the manual operation ring 23. Further, oil grooves 26f and 23i are formed in the outer circumferential surfaces of the fitting engagement parts 26a and 23f.

The rear fixed tube (fixed member) 22b has a fitting engagement part 22c formed to fittingly engage the manual operation ring 23. The fitting engagement part 22c is machined to have a fitting engagement groove 22d formed to engage cam followers 24 which are fixed with screws at a plurality of parts. The cam followers 24 are arranged at three to six equally spaced positions in the circumferential direction.

The manual operation ring 23 has a fitting engagement part 23h formed on its inner side to engage the rear fixed tube 22b. The fitting engagement part 23h is machined to have a fitting engagement groove (guide groove) formed to engage the cam followers 24. The fitting engagement part 23h is further machined to have inserting holes 23c formed in the same number of parts as the cam-follower mounting parts provided for allowing the cam followers 24 to be mounted from the outer side of the manual operation ring 23. The manual operation ring 23 is thus arranged to be rotatively operable in a set position in the optical axis direction.

A groove 23d is formed on the outer side of the manual operation ring 23. An operation rubber piece 25 is fitted into the groove 23d to prevent the inserting holes 23c of the manual operation ring 23 from being exposed to the outside.

In the second embodiment, with the lens barrel arranged in the above-stated manner, a circumferential groove 26d is first formed in the front exterior ring 26 at a part between the body part 26e and the fitting engagement part 26a as shown in detail in FIG. 5. A void space part 27 is formed jointly by the circumferential groove 26d and a rear end surface 26g in the optical axis direction of the body part 26e of the front exterior ring 26 and a front end surface 23j in the optical axis direction of the manual operation ring 23 which are opposed to each other. A washer (a sheet-like ring member) 28 and a wave washer (a pressing ring member) 29 are fitted into the void space part 27.

The inner circumferential edge of the washer 28 fittingly engages the bottom part of the circumferential groove 26d. The rear surface of the washer 28 abuts on the front end surface 23j in the optical axis direction of the manual operation ring 23.

The wave washer 29 is formed in a waved shape having a plurality of crests. Before the wave washer 29 is fitted into the void space part 27, the height of the wave part of the wave washer 29 is a little larger than the size of the space part 27 in the optical axis direction. When the manual operation ring 23 is mounted with the washer 28 and the wave washer 29 inserted into the space part 27, therefore, the washer 28 is pushed against the front end surface 23j of the manual operation ring 23 by the force of resilience generated by the elastic deformation of the crest part of the wave washer 29.

A circumferential groove 23g is formed also in a part of the manual operation ring 23 between the body part 23e and the fitting engagement part 23f of the manual operation ring 23. A void space part 31 is formed by the circumferential groove 23g and a rear end surface in the optical axis direction of the body part 23e of the manual operation ring 23 and a front end surface in the optical axis direction of the rear exterior ring 30 which are opposed to each other. A washer (a sheet-like ring member) 32 and a wave washer (a pressing ring member) 33 are fitted into the void space part 31.

The inner circumferential edge of the washer 32 fittingly engages the bottom part of the circumferential groove 23g. The rear surface of the washer 32 abuts on the front end surface in the optical axis direction of the rear exterior ring 30.

The wave washer 33 is formed in a waved shape having a plurality of crests. Before the wave washer 33 is fitted into the void space part 31, the height of the wave part of the wave washer 33 is a little larger than the size of the space part 31 in the optical axis direction. When the manual operation ring 23 is mounted with the washer 32 and the wave washer 33 inserted into the space part 31, therefore, the washer 32 is pushed against the front end surface of the rear exterior ring 30 by the force of resilience generated by the elastic deformation of the crest part of the wave washer 33.

The washers 28, 29, 32 and 33 are made of plastic sheet material or vinyl chloride sheet material. The resilient forces generated with the waved shapes of the wave washers 29 and 33 pushed are weak forces and are nothing more than a force just strong enough for pushing the washers 28 and 32 respectively against the manual operation ring 23 and the rear exterior ring 30.

Each of the washers 28, 29, 32 and 33 is formed in a ring-like shape without any notched or cut part.

With the lens barrel arranged as described above, the washers 28 and 32 and the water-repellent agent effectively prevent water and dust from intruding from outside into the inside of the lens barrel through clearances between the fitting engagement parts 23a, 26a, 23f and 30a of the manual operation ring 23 and exterior rings 26 and 30. Besides, since the washers 28 and 32 are made of plastic sheet, vinyl chloride sheet or the like, the use of them makes the manual operation ring 23 more smoothly movable, requiring a less amount of operation force than the use of rubber O-rings having large friction.

Further, although the water-repellent agent is applied to the fitting engagement parts 23a, 26a, 23f and 30a, the water-repellent agent is effectively prevented from leaking to the outside by the washers 28 and 32.

According to the invention, as described in the foregoing, sheet-like ring members are arranged to block clearances existing between fitting engagement parts of a rotating member and exterior members. Water and dust, therefore, are effectively prevented from intruding from outside into the lens barrel through the clearances between the fitting engagement parts. Besides, since the sheet-like ring members are made of plastic sheet or vinyl chloride sheet, the rotating member can be more smoothly moved and can be operated with a less operating force than a case where rubber O-rings are used.

Further, although a water-repellent agent such as grease, silicone oil or the like is applied to the fitting engagement parts, the use of the above-stated sheet-like ring members effectively prevents the water-repellent agent from leaking to the outside.

What is claimed is:

1. A lens barrel comprising:
   fixed tubes each arranged to hold an optical unit having an optical axis;
   a rotating tube arranged to rotate around the optical axis with respect to said fixed tubes,
      wherein said rotating tube is provided, at front and rear portions thereof as viewed along the optical axis, respectively with end surfaces of ring shape having a center thereof on the optical axis, and each of said fixed tubes is provided with an end surface opposite to the associated end surface of said rotating tube; and
   sheet members of ring shape having a center thereof on the optical axis, each of said sheet members being disposed on a space formed by each end surface of said rotating tube and the associated end surface of said fixed tubes.

2. A lens barrel according to claim 1, wherein a wave washer of ring shape having a center thereof on the optical axis, and having convex portions and concave portions as viewed along the optical axis, is disposed in each space.

3. A lens barrel according to claim 1, wherein said rotating tube is a manual operation ring arranged to be manually rotated to move another optical unit along the optical axis.

4. A lens barrel according to claim 1, wherein each of said fixed tubes has a sliding surface arranged to restrict movement of said rotating tube along the optical axis and to allow said rotating tube to rotate thereon.

5. A lens barrel according to claim 4, wherein a water-repellant agent is applied to said sliding surface.

6. A lens barrel according to claim 1, wherein said sheet number are made of plastic material.

7. A lens barrel according to claim 1, wherein said sheet number are made of vinyl chloride material.

8. A lens barrel comprising:
   a fixed tube having an optical axis,
   a rotating tube arranged to rotate around the optical axis of the fixed tube,
      wherein said rotating tube is provided, at a portion thereof along the optical axis, with an end surface of ring shape having a center thereof on the optical axis,
   a restriction member of ring shape having a center thereof on the optical axis, which restricts movement of the rotating tube in the optical axis direction,
      wherein said restriction member has an end surface opposed to the end surface of the rotating tube to restrict the movement of the rotating tube in the optical axis direction,
   a sheet member of ring shape having a center thereof on the optical axis, disposed in a space formed between the end surface of the rotating tube and the opposing end surface of the restriction member, and
   a pressing member which presses the sheet member between the end surface of the restriction member and the end surface of the rotating tube.

9. A lens barrel according to claim 8, wherein said pressing member is a wave washer of ring shape having a center thereof on the optical axis, and having a convex portion and a concave portion as viewed along the optical axis and is disposed in the space.

10. A lens barrel according to claim 8, wherein said rotating tube is a manual operation ring arranged to be manually rotated to move another optical unit along the optical axis.

11. A lens barrel according to claim 8, wherein said fixed tube has a sliding surface arranged to restrict movement of said rotating tube along the optical axis and to allow said rotating tube to rotate thereon.

12. A lens barrel according to claim 11, wherein a water-repellant agent is applied to said sliding surface.

13. A lens barrel according to claim 8, wherein said sheet member is made of plastic.

14. A lens barrel according to claim 8, wherein said sheet member is made of vinyl chloride material.

15. A lens barrel, comprising:
   a fixed tube having an optical axis,
   a rotating tube arranged to rotate around the optical axis of the fixed tube,
      wherein said rotating tube is provided at front and rear portions thereof as view along the optical axis respectively with an end surface of ring shape having a center thereof on the optical axis,
   a restriction member of ring shape having a center thereof on the optical axis, which restricts movement of the rotating tube back and forth in the optical axis direction of the rotating tube,
      wherein said restriction member has end surfaces respectively opposing to the end surfaces of the rotating tube and restricts the movement of the rotating tube in the optical axis direction,
   sheet members of ring shape each having a center thereof on the optical axis and each being disposed in a space formed between the rear end surface of the rotating tube and the opposing end surface of the restriction member and a space formed between the front end surface of the rotating tube and the opposing end surface of the restriction member, and
   pressing members which press the respective sheet members between the end surfaces of the respective rotating tubes and the end surfaces of the respective restriction members.

* * * * *

UNITED STATES PATENT AND TRADEMARK OFFICE
CERTIFICATE OF CORRECTION

PATENT NO. : 6,301,060 B1
DATED : October 9, 2001
INVENTOR(S) : Takashi Watanabe et al.

It is certified that error appears in the above-identified patent and that said Letters Patent is hereby corrected as shown below:

<u>Title page,</u>
Item [30], delete "Feb. 18, 1999" and insert -- Feb. 8, 1999 --.

Signed and Sealed this

Nineteenth Day of November, 2002

*Attest:*

*Attesting Officer*

JAMES E. ROGAN
*Director of the United States Patent and Trademark Office*